(12) United States Patent
McColloch

(10) Patent No.: US 8,573,862 B2
(45) Date of Patent: Nov. 5, 2013

(54) NARROW, PLUGGABLE OPTICAL TRANSCEIVER SYSTEM

(75) Inventor: Laurence Ray McColloch, Santa Clara, CA (US)

(73) Assignee: Avago Technologies General IP (Singapore) Pte. Ltd., Singapore (SG)

(*) Notice: Subject to any disclaimer, the term of this patent is extended or adjusted under 35 U.S.C. 154(b) by 786 days.

(21) Appl. No.: 12/728,906

(22) Filed: Mar. 22, 2010

(65) Prior Publication Data

US 2011/0229093 A1 Sep. 22, 2011

(51) Int. Cl.
*G02B 6/36* (2006.01)

(52) U.S. Cl.
USPC .......................................................... 385/92

(58) Field of Classification Search
USPC .......................................................... 385/92
See application file for complete search history.

(56) References Cited

U.S. PATENT DOCUMENTS

| | | | |
|---|---|---|---|
| 5,796,899 A * | 8/1998 | Butrie et al. ................ 385/92 |
| 6,746,158 B2 | 6/2004 | Merrick | |
| 6,762,940 B2 | 7/2004 | Zaremba | |
| 7,059,887 B1 | 6/2006 | Liu | |
| 7,255,490 B2 | 8/2007 | Zhang et al. | |
| 7,410,307 B2 | 8/2008 | Sasser et al. | |
| 2004/0022487 A1 | 2/2004 | Nagasaka et al. | |
| 2004/0028349 A1 | 2/2004 | Nagasaka et al. | |
| 2006/0215968 A1* | 9/2006 | Kayner et al. ................ 385/89 |
| 2009/0123116 A1* | 5/2009 | Tanaka et al. ................ 385/92 |
| 2009/0245735 A1* | 10/2009 | Shaddock et al. ............ 385/92 |
| 2010/0232749 A1* | 9/2010 | Sabbatino et al. ............ 385/92 |

* cited by examiner

Primary Examiner — Ryan Lepisto
Assistant Examiner — Jerry Blevins

(57) ABSTRACT

A transceiver module includes a housing assembly, a single optical cable receptacle, an electronics subassembly in the housing assembly having a generally planar substrate, and an optics subsystem. The optics subsystem redirects an optical beam between the surface of the substrate and an optical axis of the receptacle. The structure of the housing assembly promotes airflow through the transceiver module. The transceiver module can be plugged into a chassis or cage of an electronic system. A latching mechanism can be included to secure the transceiver module in the cage. A tab can be included to facilitate un-latching and removal of the transceiver module from the cage.

13 Claims, 10 Drawing Sheets

NARROW, PLUGGABLE OPTICAL TRANSCEIVER SYSTEM

BACKGROUND

In an optical communication system, it is typically necessary to couple an optical fiber to an opto-electronic transmitter, receiver or transceiver device and to, in turn, couple the device to an electronic system such as a switching system or processing system. These connections can be facilitated by modularizing the transceiver device. Various transceiver module configurations are known. For example, the optical transceiver module 10 illustrated in FIG. 1 has a standard configuration or form commonly referred to as a Small Form Factor (SFF) or SFF-Pluggable (SFP) format. Transceiver module 10 includes a metallic module housing 12 in which are housed opto-electronic elements, optical elements, and electronic elements, such as one or more light sources (e.g., lasers), light sensors, lenses and other optics, digital signal driver and receiver circuits, etc. The front end of transceiver module 10 further includes a transmitter receptacle 14 and a receiver receptacle 16 into which optical fiber cables (not shown) are pluggable. The optical cable plug or connector body (not shown) can be of the standard type known as an LC connector, which has a squarish profile corresponding to the shape of receptacles 14 and 16 and a width of approximately one-quarter inch. Although not shown in FIG. 1 for purposes of clarity, transceiver module 10 can be plugged into a bay in the chassis or cage of an electronic system by inserting the rear end of transceiver module 10 into a bay opening in the cage and latching transceiver module 10 in place. A bail latch 18 facilitates latching transceiver module 10 and, when flipped to an extended position (not shown), serves as a handle by which a person can grip transceiver 10 to extract it from the cage.

Transceiver module size is of concern in the art. The width of housing 12 is substantially dictated by the two side-by-side receptacles 14 and 16. That is, housing 12 is at least as wide as two LC connectors. Multiple transceiver modules of this type can thus be plugged into a cage panel at a pitch on the order of about every one-half inch. That is, the electronic system cage can have on the order of one bay for receiving on the order of one transceiver module for every one-half inch of cage width. Among other drawbacks of arranging adjacent transceiver modules so densely is that bail latch 18 may be difficult to grasp.

Transceiver module cooling is another concern in the art. The heat emitted by the electronics and opto-electronics in transceiver module 10 in operation is commonly conducted away from transceiver module 10 by metallic portions of the cage bay in which transceiver module 10 is plugged. Heat sinks can be included in the cage to dissipate this heat. Alternatively or in addition, the sides, top or bottom of housing 12 can include apertures to promote cooling air flow into and out of housing 12. Providing adequate cooling is challenging in instances in which many transceiver modules are arranged closely together in the cage.

SUMMARY

Embodiments of the present invention relate to an optical transceiver module system in which each of one or more optical transceiver modules provides an opto-electronic interface between a single optical cable and an electronic system. In an exemplary embodiment, an optical transceiver module includes an elongated rectangular transceiver module housing assembly, an electronics subassembly (ESA), and an optics subsystem. The housing assembly has two transceiver module sidewalls elongated along a length of the transceiver module, a transceiver module top wall, a transceiver module bottom wall, and no more than a single receptacle disposed at an end of the housing assembly for receiving a single-fiber optical cable plug connector, such as an LC connector.

In the exemplary embodiment, the ESA has a generally planar substrate that is substantially co-planar with one of the two sidewalls of the housing assembly. A light source, such as a laser, and a light receiver, such as a photodiode, are mounted on a surface of the substrate. The ESA is electrically mateable with an electronic system, such as by plugging the optical transceiver module into one of a plurality of bays of an electronic system chassis or cage.

The optics subsystem redirects an optical beam between the surface of the ESA substrate and an optical axis of the receptacle into which the optical cable is pluggable. For example, in an embodiment in which optical communication between the electronic system and the optical cable is bidirectional, the optics subsystem can both redirect an optical signal received via the optical cable to the light receiver and redirect an optical signal produced by the light source to the optical cable.

Other systems, methods, features, and advantages will be or become apparent to one with skill in the art upon examination of the following figures and detailed description. It is intended that all such additional systems, methods, features, and advantages be included within this description, be within the scope of the specification, and be protected by the accompanying claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention.

DETAILED DESCRIPTION

Figure 1:
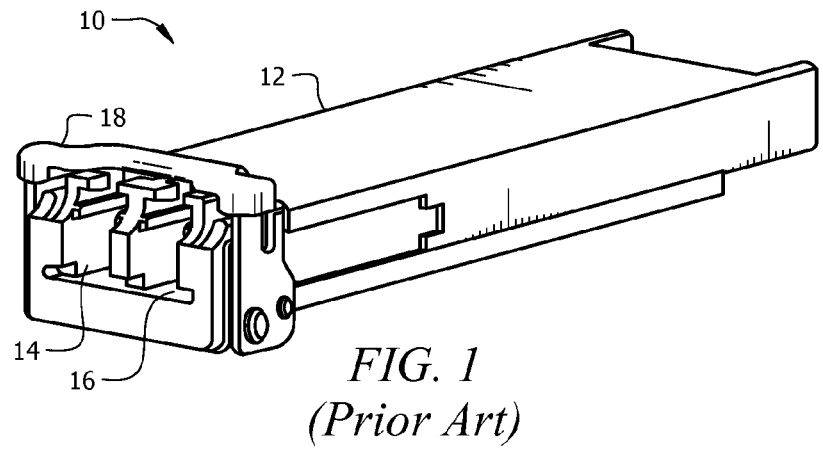
FIG. 1 is a perspective view of an optical transceiver module of a type known in the art.
Figure 2:
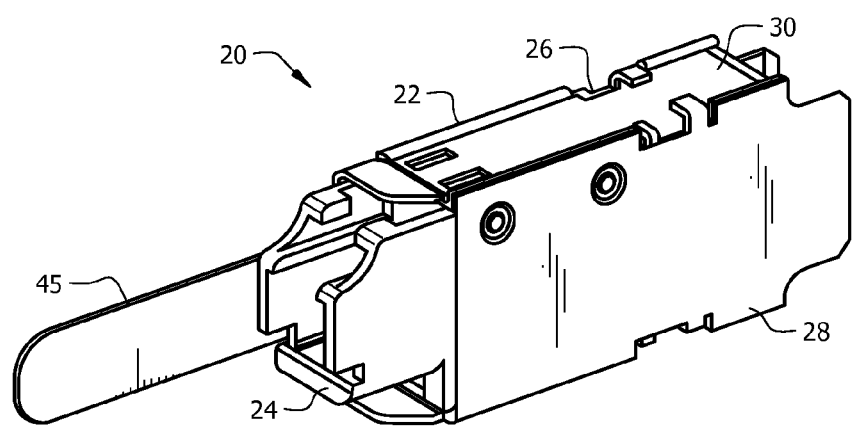
FIG. 2 is a perspective view of an optical transceiver module in accordance with an exemplary embodiment of the invention.
Figure 5:
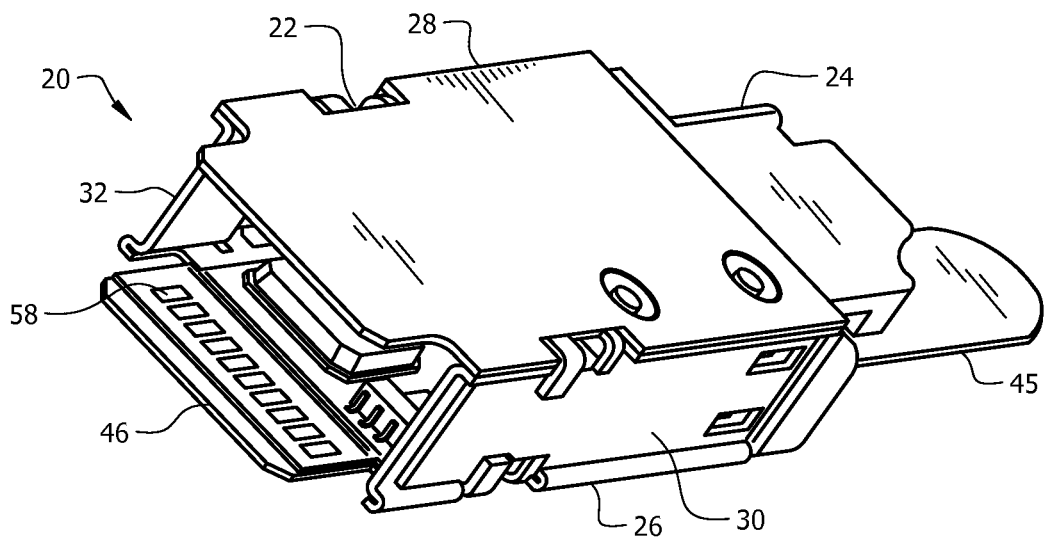
FIG. 5 is a perspective view showing one side of the optical transceiver module of FIG. 2.
Figure 6:
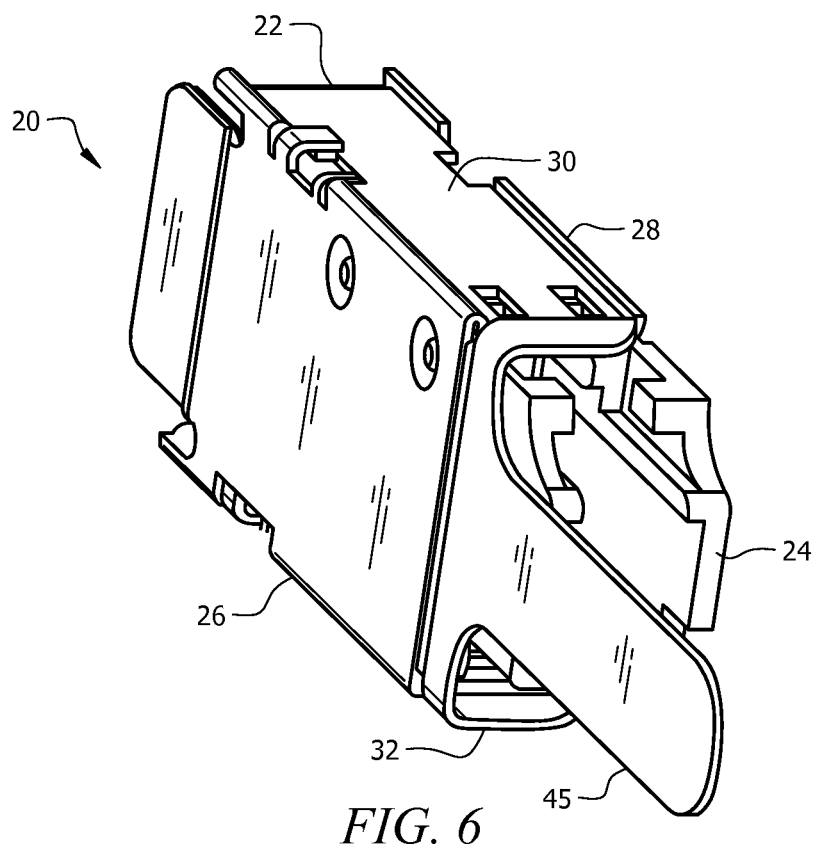
FIG. 6 is a perspective view showing another side of the optical transceiver module of FIG. 2.

As illustrated in FIG. 2, in an illustrative or exemplary embodiment of the invention, an optical transceiver module 20 has an elongated, rectangular shape defined by an elongated housing assembly 22 with a receptacle 24 disposed at a front end of housing assembly 22. With further reference to FIGS. 5 and 6, housing assembly 22 has two transceiver module sidewalls 26 and 28 that extend the length of optical transceiver module 20, a transceiver module top wall 30, and a transceiver module bottom wall 32.

Figure 3:
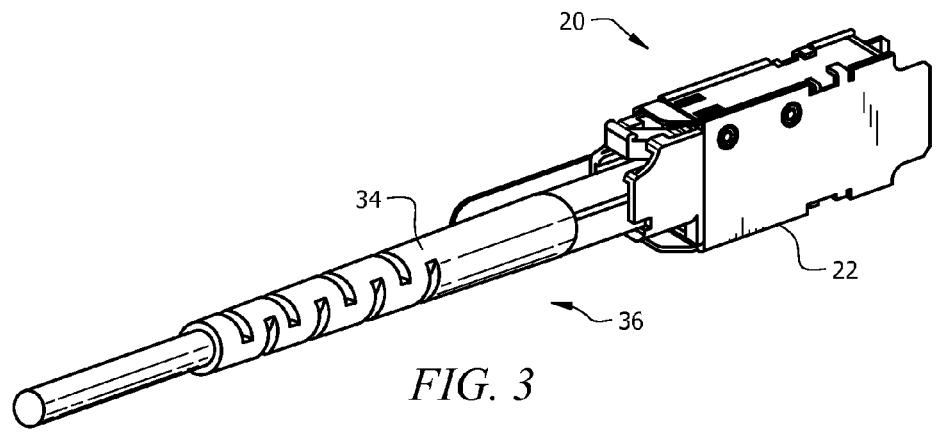
FIG. 3 is similar to FIG. 1, showing an optical cable plugged into the optical transceiver module.
Figure 4:
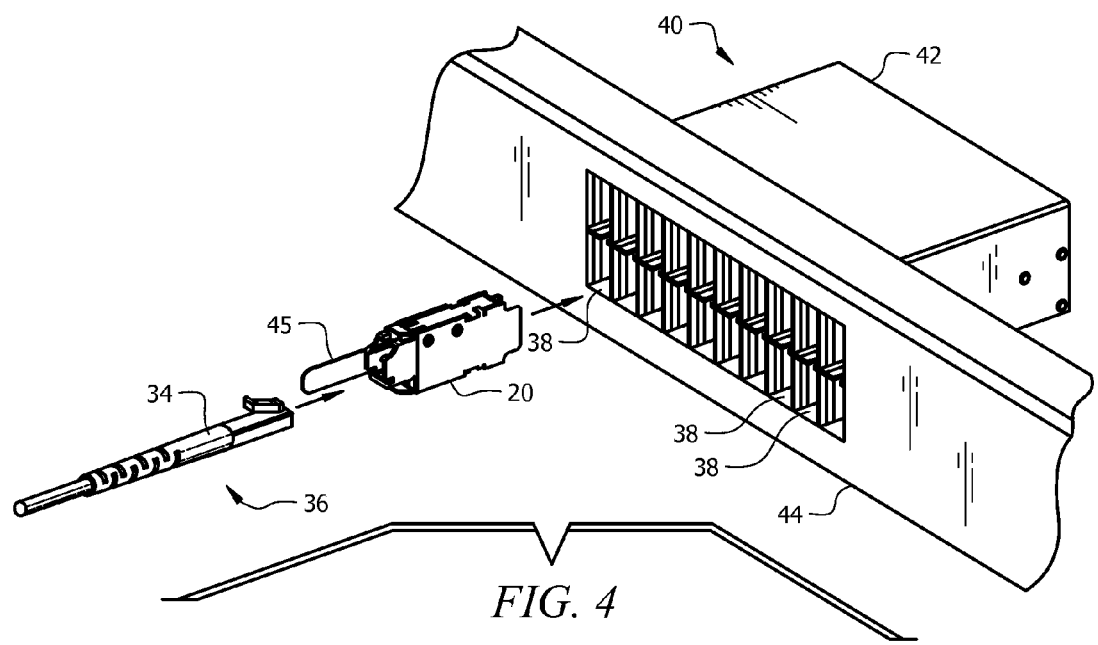
FIG. 4 is similar to FIG. 2, showing the optical cable plugging into the optical transceiver module and the optical transceiver module plugging into an electronic system cage.

As illustrated in FIGS. 3 and 4, receptacle 24 can accept a single-fiber (or "simplex") optical cable plug connector, such as an LC plug connector 34, of an optical cable 36. As the structure and operation of optical cable 36 and its LC plug connector 34 are well understood in the art, they are not described in further detail herein. A person can plug LC plug connector 34 into receptacle 24 in the conventional manner. A person can likewise plug optical transceiver module 20 into any one of a number of transceiver bays 38 in an electronic system 40. Electronic system 40 can be, for example, a switching system, a processing system, or any other suitable type of system that can be interfaced with an optical transceiver. Electronic system 40 includes a cage 42. Transceiver bays 38 of cage 42 are exposed through an opening in a front panel 44 of electronic system 40. Although only one optical transceiver module 20 is shown in FIG. 4, as optical transceiver module 20 is only slightly wider than LC plug connector 34 (typically about one-quarter inch), multiple optical transceiver modules 20 can be relatively densely arranged in the opening in front panel 44. Although optical transceiver modules in accordance with the present invention can be unidirectional in some embodiments and bidirectional in other embodiments, embodiments having bidirectional transceiver modules can achieve twice the transceiver module density of some conventional optical transceiver module systems because a bidirectional transceiver module having only a single receptacle is half as wide as a transceiver module having one receptacle for transmitting and another receptacle for receiving.

Housing assembly 22 further includes an elongated tab 45 that is substantially co-planar with sidewall 26 and extends away from the remainder of optical transceiver module 20. A person can grip tab 45 to facilitate extracting optical transceiver module 20 from cage 42, as described in further detail below.

Although in the exemplary embodiment tab 45 and sidewall 26 are separate elements (see, e.g., FIG. 6), in other embodiments such a tab and sidewall can comprise any number of one (i.e., unitarily formed with one another) or more elements. In the exemplary embodiment, tab 45 and most of transceiver module top wall 30 are unitarily formed with one another, e.g., by forming sheet metal or similar material. Unless specifically stated otherwise, any element described herein or a similar element can be unitarily formed with another element in some embodiments or a separate element (i.e., a part of a multi-part assembly element) in other embodiments. Furthermore, a reference to an element as an "assembly" or "subassembly" herein is not intended to restrict the meaning to a structure having multiple parts or portions, and in other embodiments such an element or a similar element can be unitarily formed or, alternatively, can comprise any other suitable number of parts or portions.

Figure 7:
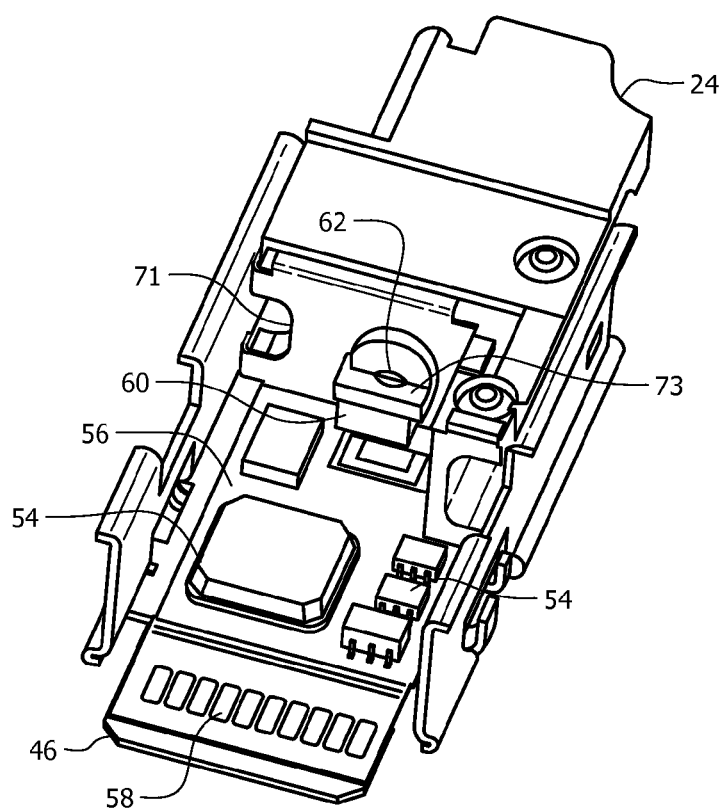
FIG. 7 is similar to FIG. 5, showing the optical transceiver module of FIG. 2 without the cover of the transceiver module housing assembly.
Figure 8:
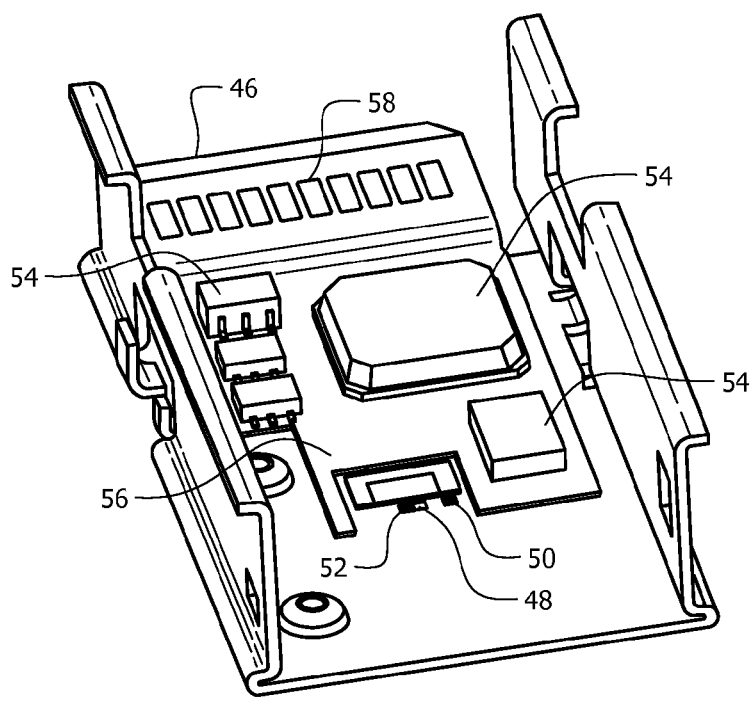
FIG. 8 is similar to FIG. 7, showing the optical transceiver module of FIG. 2 without both the optical connector receptacle and the cover of the transceiver module housing assembly.

As illustrated in FIGS. 7 and 8, optical transceiver module 20 further includes an electronics subassembly (ESA) 46. The ESA 46 has a generally planar substrate on which electronic and electro-optical elements, such as a light source 48, a light receiver 50, a feedback receiver 52, and various driver and receiver circuit devices and other such circuit devices 54, are mounted. Light source 48 can be a laser, such as a vertical-cavity surface-emitting laser (VCSEL). Light receiver 50 and feedback receiver 52 can be photodiodes, such as a positive-intrinsic-negative (PIN) diode. In the exemplary embodiment, the substrate includes a portion of transceiver module sidewall 26. That is, the bottom surface of a flex circuit 56, on which are mounted circuit devices 54, is adhered to or otherwise disposed on a surface of transceiver module sidewall 26, while light source 48, light receiver 50, and feedback receiver 52 are mounted directly on the surface of transceiver module sidewall 26. Although a combination of a portion of the substantially planar flex circuit 56 and a portion of the substantially co-planar transceiver module sidewall 26 define the substrate on which the above-referenced elements are mounted in the exemplary embodiment, in other embodiments any other arrangement that provides a substantially planar ESA substrate is suitable. In this regard "substantially co-planar" refers to two substantially planar elements that lie flat against one another (e.g., are bonded to one another) or close to one another.

In the exemplary embodiment, sidewalls 26 and 28 are made of a suitable metal such as nickel-plated copper, which serves as a heat sink for light source 48, light receiver 50, and feedback receiver 52. Although not shown for purposes of clarity, the various electronic and electro-optical elements are electrically connected to one another by wirebonds and the circuit traces on flex circuit 56.

The ESA 46 also includes an array of electrical contacts 58, which can be metallic pads on flex circuit 56. The array of electrical contacts 58 mates with mating contacts (not shown) in a bay 38 of cage 42 (FIG. 4) when transceiver module 20 is plugged into one of bays 38. Note that the array of electrical contacts 58, like other elements of ESA 46, is substantially co-planar (but for a slight offset or step in the illustrated embodiment) with the substrate of ESA 46. Providing an array of electrical contacts 58 and other ESA features that do not impede air flow through optical transceiver module 20 aids cooling, as described in further detail below.

Figure 9:
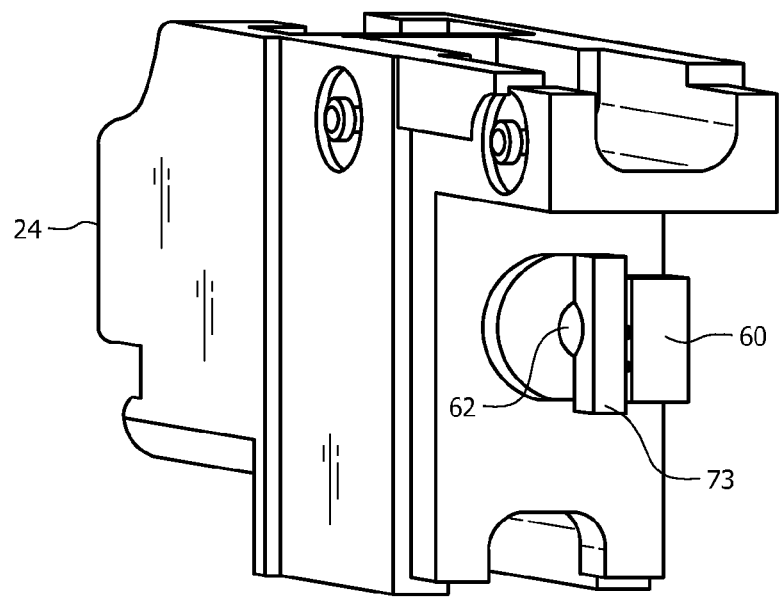
FIG. 9 is a perspective view of one side of the receptacle of the optical transceiver module of FIG. 2.
Figure 10:
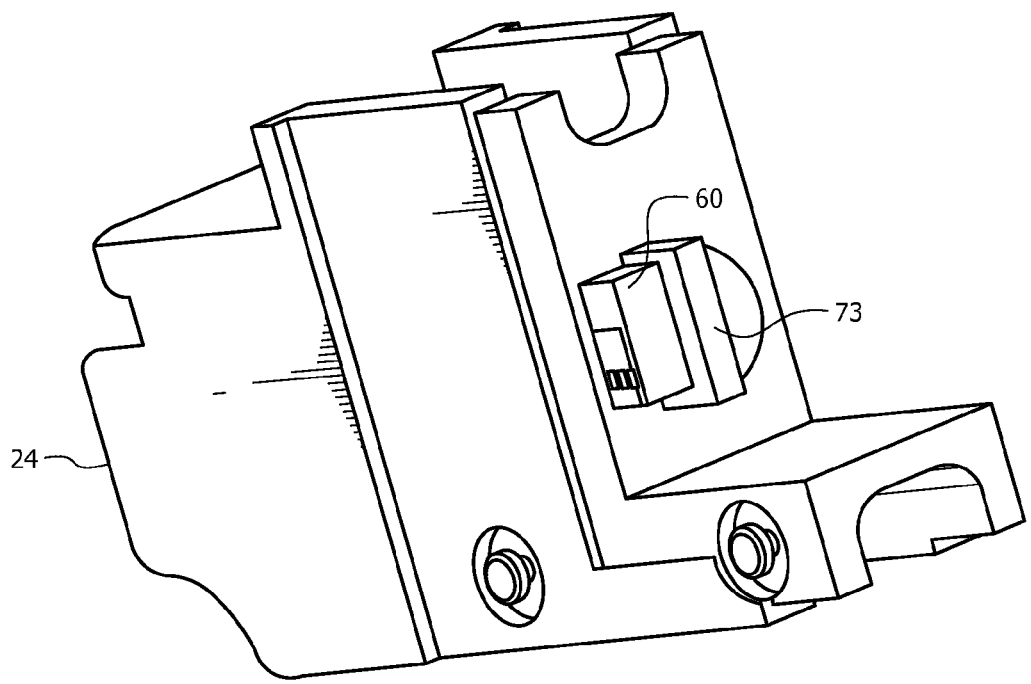
FIG. 10 is similar to FIG. 9, showing another side of the receptacle.
Figure 11:
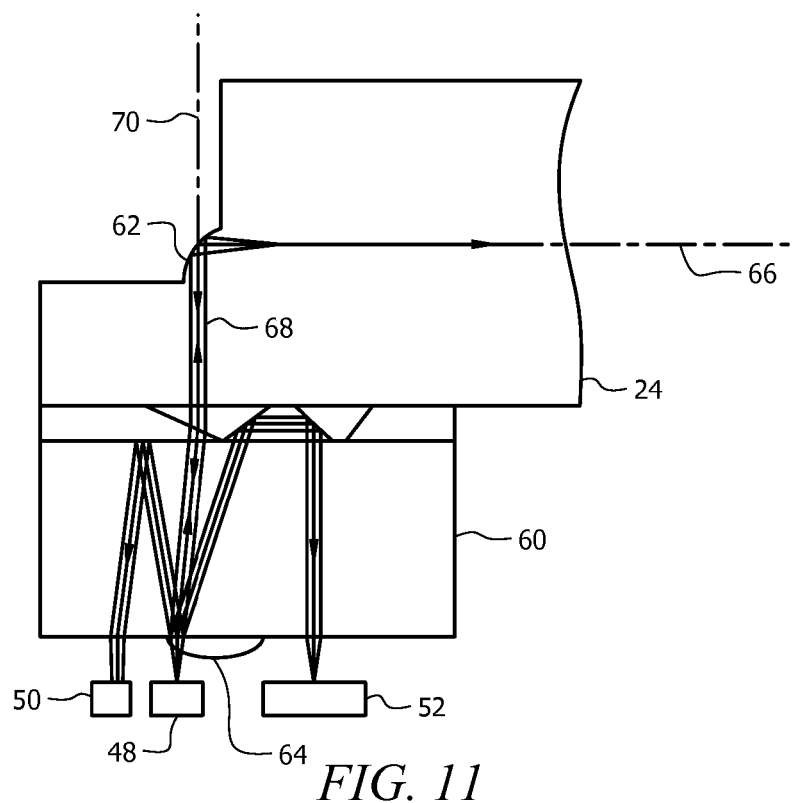
FIG. 11 illustrates optical paths through the optics subsystem of the optical transceiver module of FIG. 2.

With further reference to FIGS. 9-11, in the exemplary embodiment optical transceiver module 20 further includes an optics subsystem comprising an optical splitter 60, a total internal reflection (TIR) lens 62, and a lens 64. Optical splitter 60 allows bidirectional optical communication without requiring multiple wavelengths (or "colors") of light and attendant filters. The optics subsystem bidirectionally redirects an optical beam between the above-referenced electro-optical elements on the surface of the ESA substrate and a receptacle optical axis 66. More specifically, TIR lens 62 bidirectionally redirects a bidirectional optical beam 68 between a splitter optical signal axis 70 and receptacle optical axis 66, while optical splitter 60 splits optical signals received on bidirectional optical beam 68 and optical signals transmitted on optical beam 68. That is, optical splitter 60 directs the signals received on bidirectional optical beam 68 toward light receiver 50 and directs the signals produced by light source 48 onto bidirectional optical beam 68. Optical splitter 60 further directs a portion of the signals produced by light source 48 onto feedback receiver 52. It should be noted that although in the exemplary embodiment of the invention the optics subsystem includes optical splitter 60, in other embodiments, such as an embodiment in which the optical transceiver module is uni-directional (i.e., transmit-only or receive-only), a splitter or similar element need not be included.

Shielding against electromagnetic interference (EMI) can be provided. For example, as illustrated in FIG. 7, an EMI shield 71 can be included between receptacle 24 and ESA 46 to shield ESA 46 against EMI. In the exemplary embodiment, EMI shield 71 is attached to receptacle 24. A projection 73 that encloses TIR lens 62 on receptacle 24 protrudes through an opening in EMI shield 71. Optical splitter 60 is attached to projection 73. In this arrangement, EMI shield 71 is interposed between receptacle 24 and the optics subsystem, ESA 46, and other portions of the interior of optical transceiver module 20.

Figure 12:
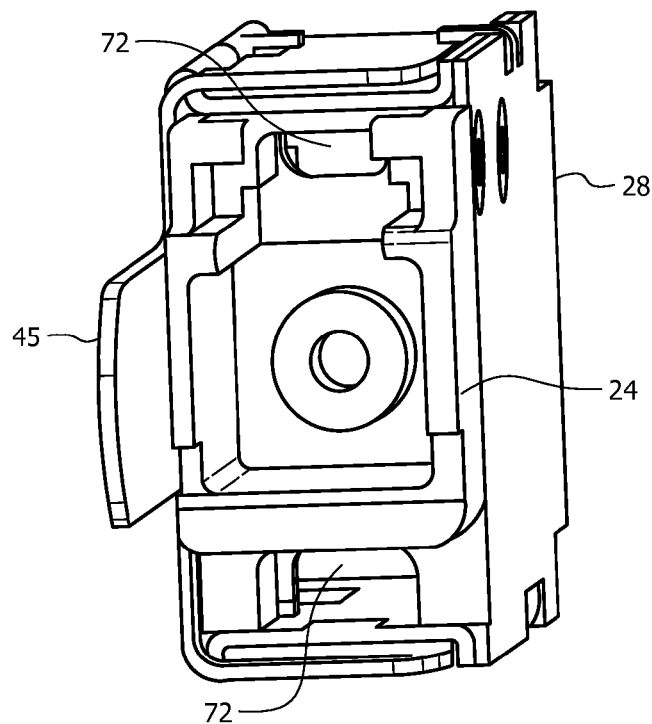
FIG. 12 is similar to FIGS. 9-10, showing the front of the receptacle.
Figure 13:
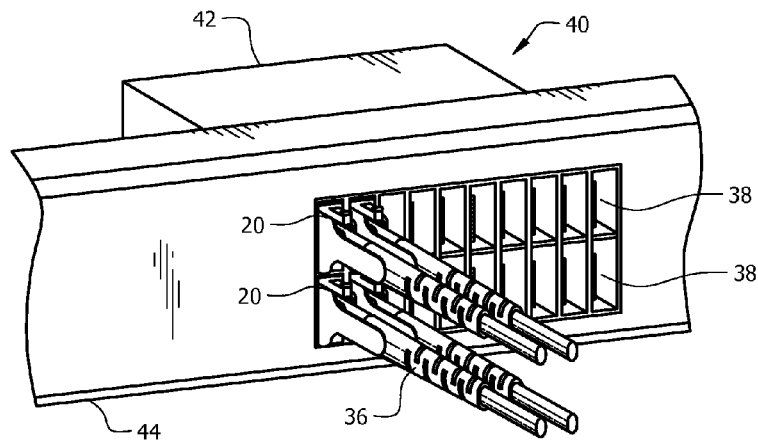
FIG. 13 is a perspective view of an electronic system chassis or cage into which a number of optical transceiver modules are plugged, in accordance with the exemplary embodiment of the invention.
Figure 14:
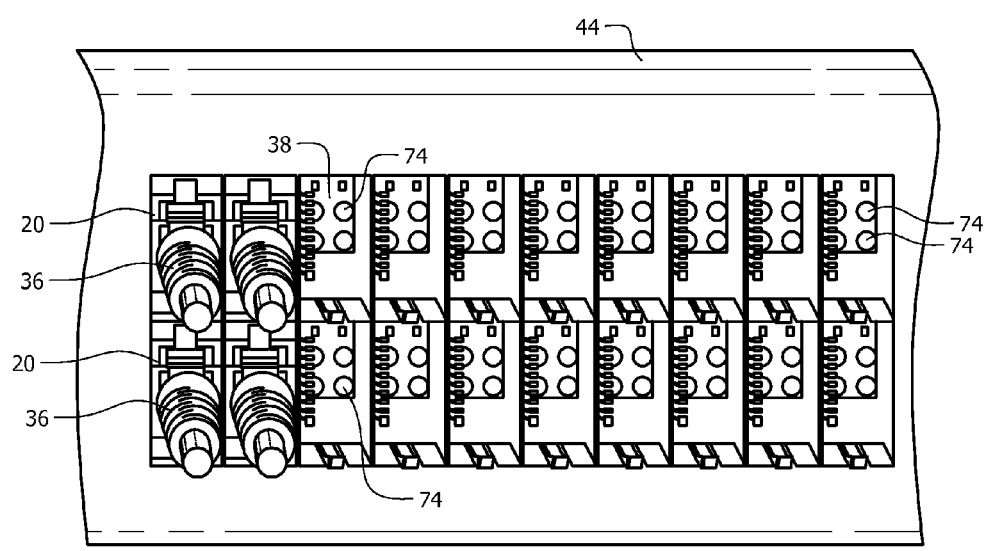
FIG. 14 is similar to FIG. 13, showing the apertures in the cage for promoting air flow through the optical transceiver modules.

As illustrated in FIGS. 12-14, receptacle 24 has apertures 72 (FIG. 12), and bays 38 of cage 42 similarly have apertures 74 (FIG. 14), so that when optical transceiver module 20 is plugged into one of bays 38, air can flow through the length of optical transceiver module 20. Note in, for example, FIG. 5, that the end of housing assembly 22 opposite the end at which receptacle 24 is disposed is substantially open or unobstructed, because the substrate of ESA 46, including the array of electrical contacts 58, is substantially co-planar with transceiver module sidewall 26. That is, because ESA 46 lies substantially flat against (or defines a portion of) a wall of housing assembly 22, ESA 46 does not obstruct air flow through housing assembly 22. Electronic system 40 or its cage 42 can include one or more fans (not shown for purposes of clarity) to force air through the length of multiple transceiver modules 20 that may be plugged into cage 42. By selectively powering an arrangement of fans, cooling can be tailored to the number, type and locations of transceiver modules 20 in cage 42.

Figure 15:
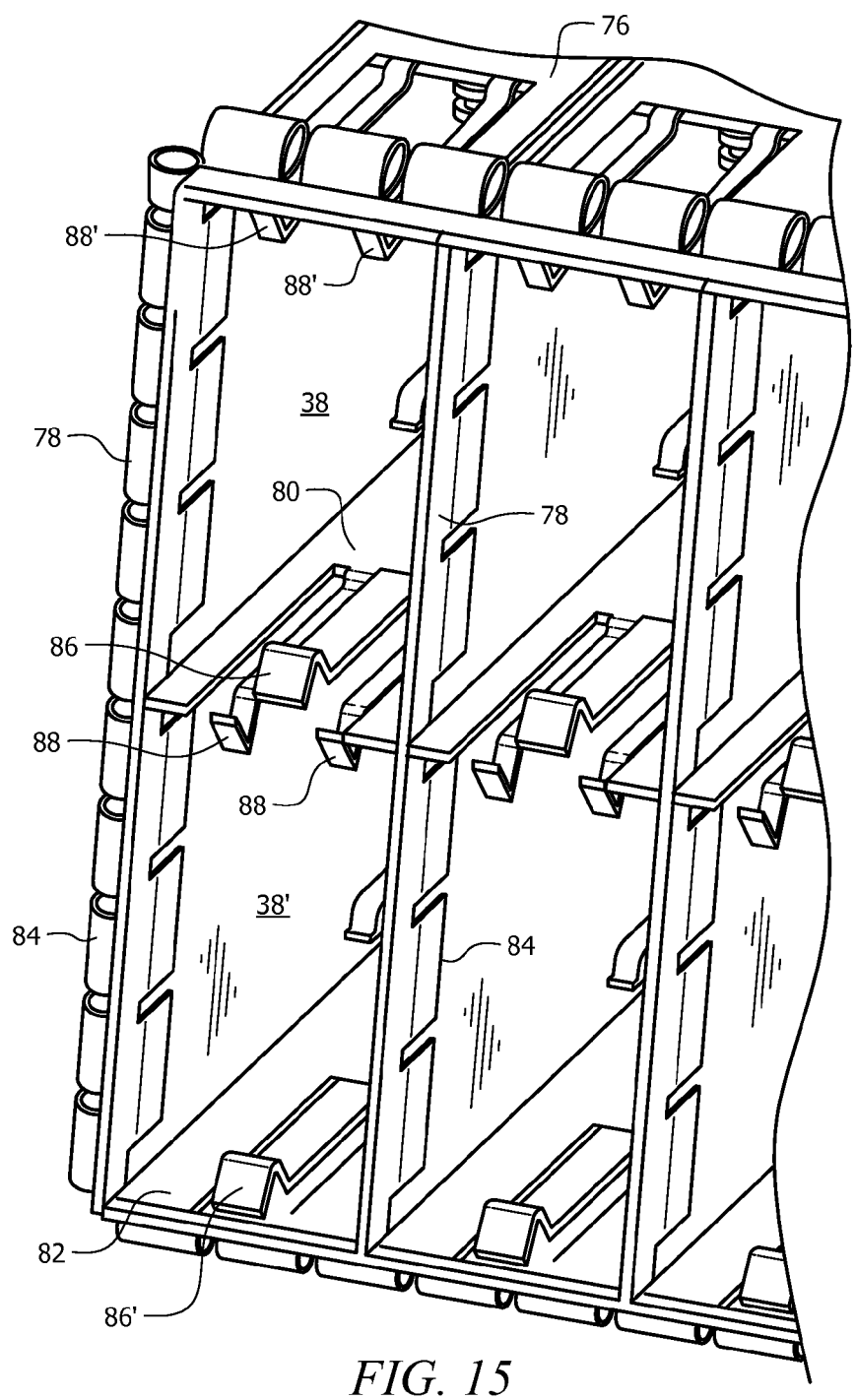
FIG. 15 is a perspective view of an electronic system cage, in accordance with the exemplary embodiment of the invention.

As illustrated in FIG. 15, bays 38 of cage 44 have rectangular openings, corresponding to the profile of transceiver module 20. In the exemplary embodiment of the invention, cage 42, which is made of a material such as sheet metal, has two rows of bays 38. For example, an upper bay 38 is defined by a top upper bay wall 76, two upper bay sidewalls 78, and a common wall 80. Similarly, a lower bay 38' that is directly beneath upper bay 38 is defined by a bottom lower bay wall 82, two lower bay sidewalls 84, and common wall 80. Common wall 80 has a latch engagement comprising an upper deflectable portion 86 and twin lower deflectable portions 88. Upper and lower deflectable portions 86 and 88 are unitarily formed in the sheet metal of common wall 80 by, for example, cutting and bending the sheet metal. As forming sheet metal is an economical operation, such latch engagements can thus be provided economically in each bay 38 of cage 44. It should be noted that although common wall 80 includes a latch engagement having both an upper deflectable portion 86 and lower deflectable portions 88, top upper bay wall 76 of upper bay 38 includes a similar latch engagement having only the twin lower deflectable portions 88', while bottom lower bay wall 82 of lower bay 38' includes another similar latch engagement having only an upper deflectable portion 86'. It should be understood that the terms "upper" and "lower" as used herein are intended only for convenience of reference with regard to the illustrated embodiment and are not intended to imply any limitation to the manner in which elements can be oriented.

Figure 16:
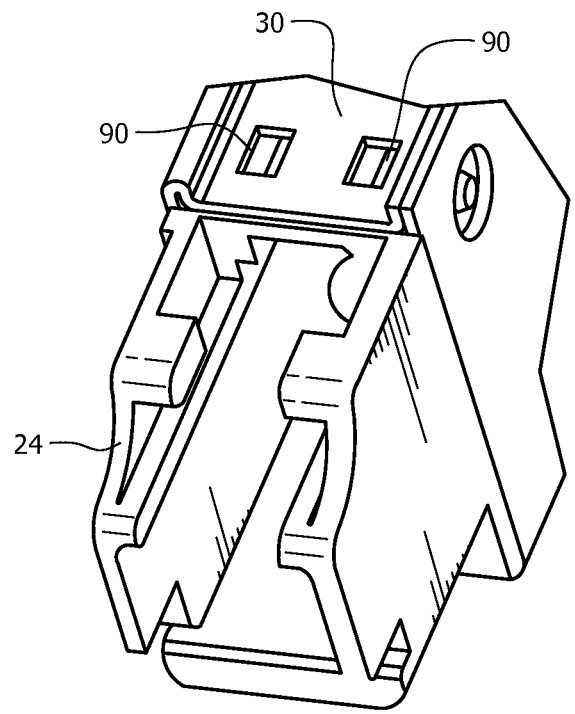
FIG. 16 is a perspective view of a portion of the optical transceiver module of FIG. 2, showing a module top latch engagement in the transceiver module top wall.
Figure 17:
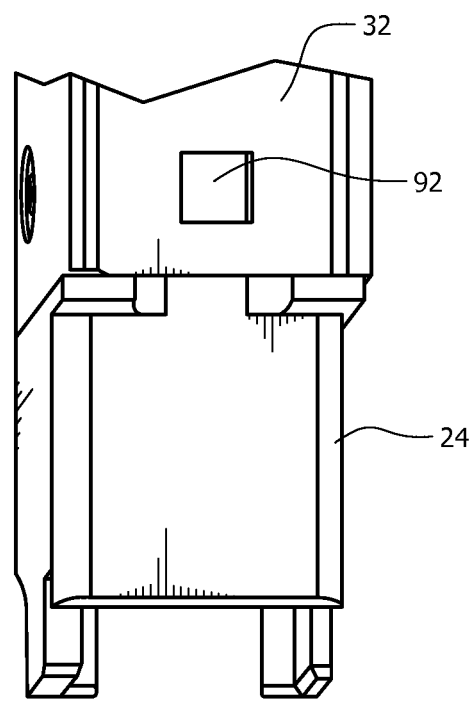
FIG. 17 is a perspective view of a portion of the optical transceiver module of FIG. 2, showing a module bottom latch engagement in the transceiver module bottom wall.
Figure 18:
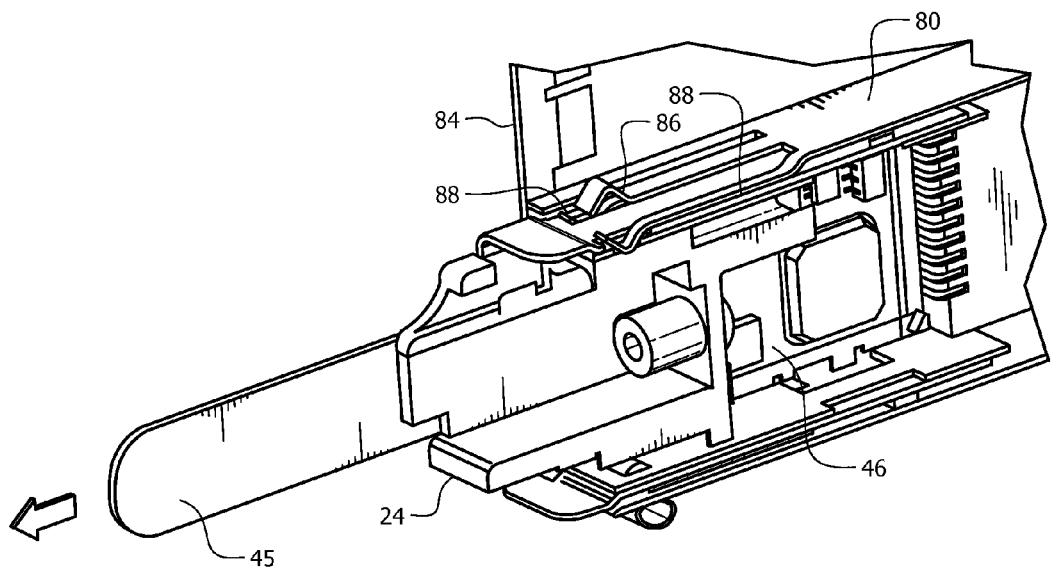
FIG. 18 is a perspective view of the transceiver module of FIG. 2 plugged into a bay of the electronic system cage, without the cover of the transceiver module housing assembly.
Figure 19:
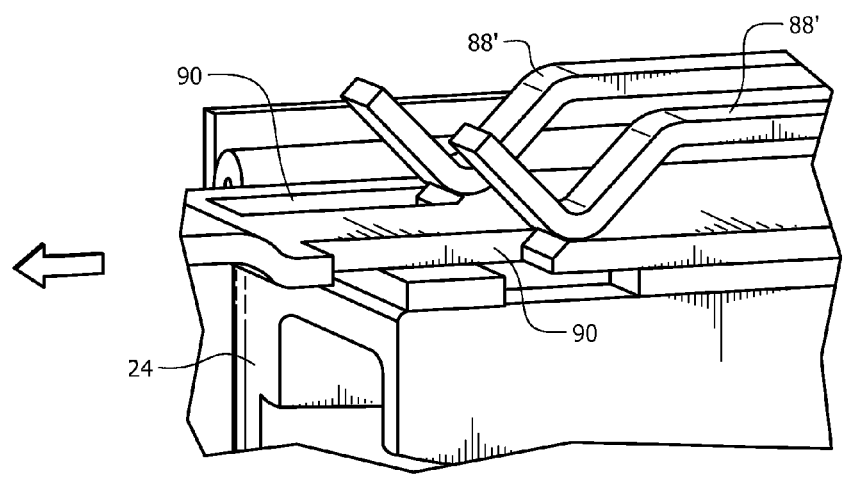
FIG. 19 is a perspective view similar to a portion of FIG. 18, partially cut away and enlarged to show the top latch engagement of the transceiver module and the mating latch engagement of the electronic system cage.

The above-described latch engagements of bays 38 are mateable with latch engagements on the top and bottom of optical transceiver module 20. As illustrated in FIGS. 16-17, in the exemplary embodiment transceiver module top wall 30 has two slots or recesses 90 that serve as a module top latch engagement, and transceiver module bottom wall 32 has a similar slot or recess 92 that serves as a module top latch engagement. As illustrated in FIGS. 18-19, the module top latch engagement and module bottom latch engagement are mateable with the above-described mating latch engagements in bays 38 of cage 42.

As optical transceiver module is initially inserted into, for example, lower bay 38', transceiver module top wall 30 deflects lower deflectable portions 88 upwardly. Lower deflectable portions 88 and 88' have skid-like or ramp-like tips that minimize initial resistance to engagement by transceiver module top wall 30. Upper deflectable portions 86 and 86' have similar tips. Thus, although not shown for purposes of clarity, transceiver module bottom wall 32 similarly deflects upper deflectable portion 86' (FIG. 15) upwardly. As optical transceiver module 20 is inserted further into lower bay 38', the position shown in FIG. 18 is reached in which the tips of lower deflectable portions 88, which protrude downwardly, settle into recesses 90 as a result of the resilient force exerted by the flexed lower deflectable portions 88, thereby latching optical transceiver module 20 in place. The tip of upper deflectable portion 86' similarly settles into recess 92. In the latched position shown in FIG. 18, the engagement of the tips of lower deflectable portions 88 with the corresponding recesses 90 and the engagement of the tip of upper deflectable portion 96' secure optical transceiver module 20 against advertent removal.

To remove optical transceiver module 20, a person can grasp tab 45 and pull optical transceiver module 20 in the direction of the arrow in FIGS. 18 and 19. The pulling force ramps the tips of lower deflectable portions 88 out of the corresponding recesses 90, deflecting lower deflectable portions 88, while similarly ramping the tip of upper deflectable portion 86' out of the corresponding recess 92 and deflecting upper deflectable portion 86'. Note with reference to, for example, FIGS. 13-14, that the thin tab 45 protrudes prominently between adjacent optical transceiver modules 20 and optical cables 36 and is thus relatively easy to grasp.

Although not shown for purposes of clarity, optical transceiver module 20 can be similarly mounted in upper bay 38. As optical transceiver module 20 is initially inserted into upper bay 38, transceiver module top wall 30 deflects lower deflectable portions 88' (FIG. 15) upwardly while transceiver module bottom wall 32 deflects upper deflectable portion 86 of common wall 80 downwardly. As optical transceiver module 20 is inserted further into upper bay 38, the above-described latched position is reached. Accordingly, the tips of lower deflectable portions 88' settle into recesses 90, and the tip of upper deflectable portion 86 of common wall 80 settles into recess 92. In this manner, upper deflectable portion 86 of common wall 80 aids latching of optical transceiver module 20 in upper bay 38, and lower deflectable portions 88 of common wall 80 aids latching of optical transceiver module 20 in lower bay 38'. Common wall 80 and its latch engagement are thus shared by or common to both upper bay 38 and lower bay 38'.

One or more illustrative embodiments of the invention have been described above. However, it is to be understood that the invention is defined by the appended claims and is not limited to the specific embodiments described.

What is claimed is:

1. An optical transceiver module system, comprising:
   an elongated rectangular transceiver module housing assembly having two transceiver module sidewalls elongated along a length of a transceiver module, a transceiver module top wall, a transceiver module bottom wall, and no more than a single receptacle disposed at an end of the housing assembly for receiving a single-fiber optical cable plug connector;
   an electronics subassembly (ESA) having a generally planar substrate, the substrate substantially co-planar with one of the two sidewalls of the housing assembly, the ESA having a light source and a light receiver mounted on a surface of the substrate, the ESA electrically mateable with an electronic system connector; and
   an optics subsystem, the optics subsystem redirecting an optical beam between the surface of the substrate and an optical axis of the receptacle.

2. The optical transceiver module system claimed in claim 1, wherein the receptacle is an LC connector receptacle.

3. The optical transceiver module system claimed in claim 1, wherein the ESA includes an array of electrical contacts substantially co-planar with the substrate.

4. The optical transceiver module system claimed in claim 1, wherein:
   the transceiver module sidewalls are made of metal; and
   the substrate of the ESA comprises a portion of one of the transceiver module sidewalls, and at least one of the light source and light receiver is mounted on one of the transceiver module sidewalls.

5. The optical transceiver module system claimed in claim 4, wherein the substrate of the ESA further comprises a flexible printed circuit mounted on the one of the transceiver module sidewalls substantially co-planar with the one of the transceiver module sidewalls.

6. The optical transceiver module system claimed in claim 1, wherein:
   the end of the housing assembly at which the receptacle is disposed has an aperture for promoting air flow through the length of the transceiver module; and
   an end of the housing assembly opposite the end at which the receptacle is disposed has an aperture for promoting air flow through the length of the transceiver module.

7. The optical transceiver module system claimed in claim 1, wherein the housing assembly includes a substantially planar, elongated tab extending away from the housing assembly, the tab substantially coplanar with and connected in fixed relation to one of the sidewalls.

8. The optical transceiver module system claimed in claim 1, wherein the optics subsystem comprises:
   a total internal reflection (TIR) element between the surface of the substrate and the receptacle; and
   a splitter, the splitter redirecting an optical signal received from TIR element along a bidirectional optical signal axis toward the light receiver and redirecting an optical signal received from the light source toward the TIR element along the bidirectional optical signal axis.

9. The optical transceiver module system claimed in claim 1, further comprising an electromagnetic interference (EMI) shield disposed between the receptacle and the optics subsystem.

10. The optical transceiver module system claimed in claim 1, further comprising an electronic system cage in which a plurality of transceiver modules are removably mountable, wherein the top wall of the housing assembly has a module top latch engagement mateable with a mating latch engagement of an electronic system cage, and the bottom wall of the housing assembly has a module bottom latch engagement mateable with the mating latch engagement of the electronic system cage.

11. The optical transceiver module system claimed in claim 10, wherein the electronic system cage comprises a plurality of bays, an upper bay of the plurality of bays having a rectangular opening defined by a top upper bay wall, a common wall, and two upper bay sidewalls, a lower bay of the plurality of bays having a rectangular opening defined by a bottom lower bay wall, the common wall, and two lower bay sidewalls, the common wall having the mating latch engagement mateable with the module bottom latch engagement and module top latch engagement.

12. The optical transceiver module system claimed in claim 11, wherein:
   the common wall comprises a planar sheet of semi-rigid material; and
   the mating latch engagement comprises an upper deflectable portion unitarily formed in the planar sheet and a lower deflectable portion unitarily formed in the planar sheet, the upper deflectable portion deflecting into a mated position with the module bottom latch engagement when a first transceiver module is disposed in the upper bay, and the lower deflectable portion deflecting into a mated position with the module top latch engagement when a second transceiver module is disposed in the lower bay.

13. The optical transceiver module system claimed in claim 12, wherein the common wall comprises a planar sheet of metal, and the upper deflectable portion and lower deflectable portion consist of bent portions of the sheet of metal.

* * * * *